Feb. 3, 1959
J. B. POHLENZ
2,872,295
LIQUID-FLUID CONTACTOR
Filed March 12, 1956
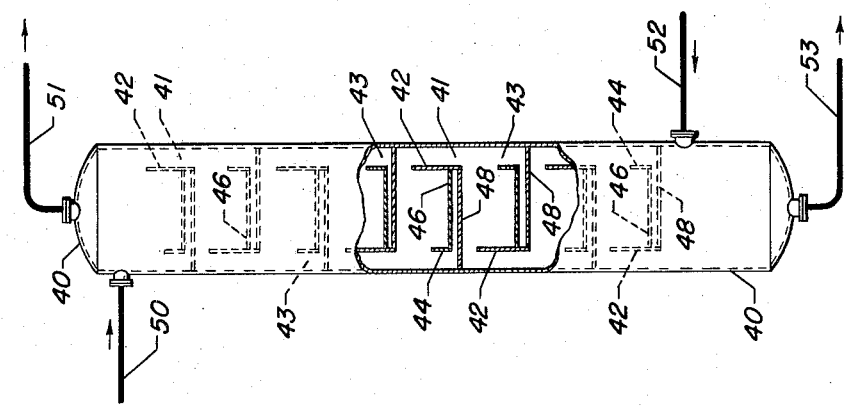
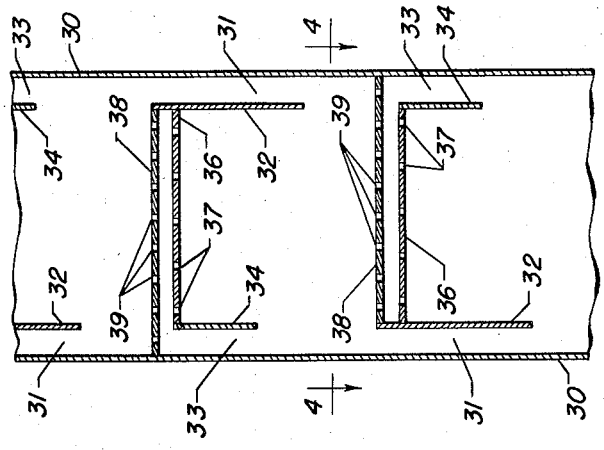
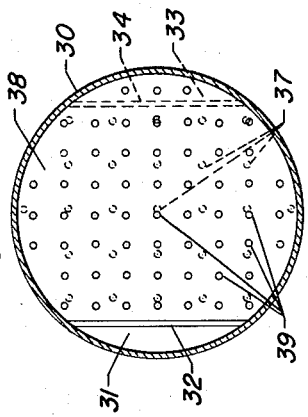
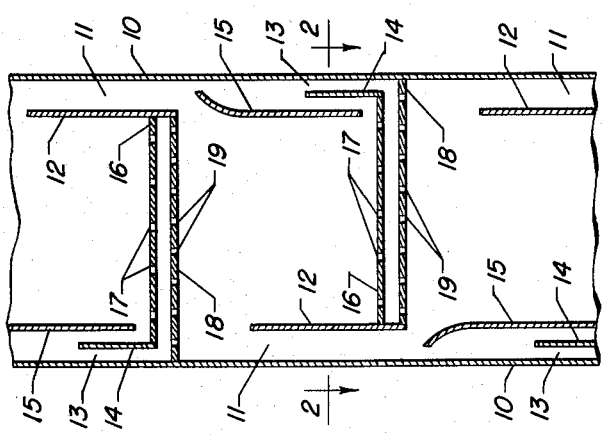
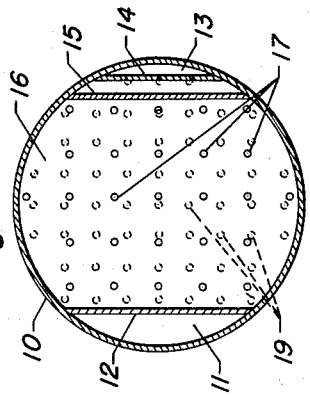
INVENTOR:
Jack B. Pohlenz
BY:
Chester J. Giuliani
Glen R. Grunewald
ATTORNEYS:

United States Patent Office 2,872,295
Patented Feb. 3, 1959

2,872,295

LIQUID-FLUID CONTACTOR

Jack B. Pohlenz, Riverside, Ill., assignor to Universal Oil Products Company, Des Plaines, Ill., a corporation of Delaware Application March 12, 1956, Serial No. 571,013

3 Claims. (Cl. 23—270.5)

This invention relates to a liquid-fluid contacting column and in particular to a unique sieve deck design which is especially useful in multi-stage liquid-fluid contactors.

Liquid-fluid contacts of two general classes are frequently desirable. These general classes are contacting a liquid with another liquid which is at least partially immiscible therewith and contacting a liquid with a gas. This invention broadly relates to both types but finds particular utility in contacting liquids with other immiscible liquids and the discussion of this invention will be largely limited to this type of contact. It is to be understood, however, that describing this invention in relation to liquid-liquid contacts is not intended to remove liquid-gas contacts from its broad scope.

Frequently in liquid-liquid contacts a stable or semistable dispersion of one liquid phase in the other occurs. When the dispersion occurs, the operability of a multi-stage contactor is impaired unless the dispersion settles in a shorter time than it takes for the various fluids to pass between zones. Therefore, in a multistage liquid-liquid contactor when a stable dispersion occurs, the continuous phase becomes entrained in the discontinuous with the result that the dispersed liquid is physically carried back to the stage from which it came resulting in destruction of countercurrent contact and unnecessary loading of the apparatus. As hereinbefore stated, the criterion in determining whether or not a dispersion will cause difficulty is its settling time in relation to the rate at which it travels through a stage.

When an entrainment problem is encountered in an ordinary sieve deck multi-stage contacting column, it is difficult to increase settling time and thereby reduce the entrainment problem. It may be seen, for example, that raising the liquid level on each tray in a column which is operating with the more dense phase dispersed through the perforations will increase the head of liquid on each tray. Although a greater inventory of liquid is present on each tray, the settling time is not increased a corresponding amount because the increased head causes faster flow through the perforations. Not only does the increased level on the tray fail to increase the residence time by a corresponding amount, but the higher velocity streams of liquid passing through the perforations are more turbulent than when operating at lower levels and this increased turbulence causes even greater quantities of dispersion to form so that the need for settling time is increased.

As hereinbefore described, this situation occurs in a liquid-liquid contacting column wherein the less dense phase is continuous and the more dense phase is dispersed through the less dense phase. This situation will also occur in columns wherein the less dense phase passes upwardly through the perforations and is dispersed into a continuous more dense phase passing from stage to stage through conduits discharging directly into the more dense phase in the stage below. Similarly, in liquid-gas contacts, the liquid phase or the gas phase may be dispersed and in either situation, the formation of too-stable dispersions causes the continuous phase to be recirculated. It is an object of this invention to provide a novel tray asesmbly which prevents the above described difficulties but does not unduly limit the operation of the column.

It is an embodiment of this invention to provide a sieve deck assembly comprising in combination two horizontal spaced parallel perforated plates having different open areas, first conduit means passing from beneath the lowermost of said plates to above the uppermost of said plates and extending beyond the plate having the least open area, second conduit means passing from between said parallel plates and extending through the plate having the least open area a lesser distance than said first conduit means.

In various embodiments of this invention the two conduit means may extend either above or below each tray assembly in the column depending upon whether the more dense or the less dense phase is dispersed.

It is another embodiment of this invention to provide a continuous countercurrent liquid-fluid contacting apparatus comprised of an elongated vertical column with upper fluid inlet and outlets and lower fluid inlets and outlets, said column containing several of the above described tray assemblies.

Briefly, this invention provides a sieve deck assembly consisting of two parallel perforated plates which are spaced apart so that a layer of fluid may form between them. One of the plates has less open area than the other and conduit means pass through both of said plates extending beyond the plate having the least open area into an intermediate portion of the contacting stage of which the tray assembly is a boundary. Each tray assembly also has another conduit means extending a lesser distance into the contacting stage and passing from between the parallel plates rather than through both and this conduit also passes through the plate having the least open area. Therefore, when a dispersion of one fluid in the other occurs and there is a tendency to entrain the dispersed fluid and physically carry it back into the stage from which it came, the settling time may be increased by raising the level on the tray assembly. When this happens in the tray assembly of this invention the head is increased and the fluid flow through the perforations is faster resulting in higher pressure drop across the tray. The pressure drop across the entire tray assembly, however, is distributed so that the greater portion is across the plate having the least open area, or the first plate through which the fluid passes. Therefore, the high velocity, high-kinetic energy streams of fluid passing through the perforations of the first plate discharge into a homogeneous liquid and the high energy of the droplets is converted to heat or other energy forms. The fluid between the plates passes through the plate having greater open area, experiences rather low pressure drop and falls as low-kinetic energy, non-turbulent and relatively large droplets into the less dense phase. These low-energy, non-turbulent and large droplets have very little dispersion forming tendencies and therfore the need for settling time in the stage below is not increased.

In such an operation, however, the throughput of the column is limited by the open area of the tray having the least open area. In the present invention, a second conduit is employed which passes from a point beyond the plate having the least open area to between the plates.

The function of this conduit is to limit the amount of discontinuous phase which can accumulate on each tray assembly by providing an overflow means discharging between the plates. Besides limiting the position of the interface between phases, this conduit provides a method of distributing the pressure drop between the plate having more open area and the plate having less open area so that for high throughput conditions the column may sacrifice some of its dispersion-preventing ability to obtain greater operability.

The configuration and operation of the tray assembly of this invention may be best described with reference to the accompanying drawings which illustrate in Figures 1 and 2 respectively a sectional elevation and plan view of a complete stage from a multi-stage countercurrent contacting process in which the more dense phase is dispersed into the less dense phase. Figures 1 and 2 also illustrate the overflow weir or conduit arranged to prevent too high a level on the tray but to pass only clear liquid between the plates. Figures 3 and 4 respectively illustrate a sectional elevation and plan view of a tray assembly of this invention wherein the less dense phase is dispersed. Figure 5 is a schematic elevation view of a column employing several tray assemblies of this invention.

Referring to Figures 1 and 2 in which the same numbers indicate the same parts, there is shown outer shell 10 which is usually a vertical cylinder in which the tray assemblies are disposed. Each tray assembly consists of two horizontal spaced perforated plates 16 and 18 which contain perforations 17 and 19 respectively. The trays are arranged so that one of them contains either fewer or smaller perforations than the other, at any rate, one plate has less open area than the other. Partition 12 connecting to the walls of the cylinder and extending vertically through both plates forms a passageway 11 connecting the underside of the lowermost plate 18 to a point somewhat above the upper side of the uppermost plate 16. Another partition 14 connects to the side of cylindrical shell 10 and forms another passageway 13 connecting the space between the plates to a point above the uppermost plate, however, the upper edge of partition 14 does not extend as high as the upper edge of partition 12. Although shown as partitions forming chord-shaped passageways, ordinary circular pipes or conduits of any other suitable shape may be used as long as they are disposed to conduct liquid from beneath or between the plates to the proper points above them as herein described. Furthermore, more than one of each conduit means may be employed and these may be disposed diametrically opposed as herein shown on any point around the periphery of the column or in the center of the plates. Generally, in large diameter vessels it will be desirable to have several rows of transfer conduits to avoid too much hydraulic gradient.

Another partition 15 is disposed within each contacting zone and this partition is connected to the wall of chamber 10 and extends almost to the uppermost of the perforated plates 16. The purpose of this partition, as will be hereinafter described, in greater detail, is to cause liquid of maximum clarity to overflow partition 14.

Having described the shape and disposition of the various members employed in the tray assembly of this invention, a description of their function follows. When operating a column for countercurrently contacting two immiscible liquids in the contacting stages shown in Figures 1 and 2, the more dense of the liquids will be dispersed through the perforations. In ordinary operation the more dense liquid will fall as droplets through the perforations 19 and rain down through a continuous less dense liquid which passes up the column through passageway 11, then laterally across each contacting stage and through the next higher passageway 11. When the droplets of liquid form a dispersion which does not settle in the residence time of the liquid on each plate 16, the entrained less dense liquid is carried to the next lower tray from which it came thereby destroying the countercurrent flow of the column and unnecessarily loading the column by causing more than the required amount of liquid to flow through the perforations. In order to provide longer settling time the level on each tray assembly may be raised. When this level is raised, however, a greater head of liquid on the tray causes a faster flow through the perforations 17 in plate 16. Were it not for the tray assembly of this invention, the greater pressure drop through the perforations and the resultant faster and more turbulent flow which in turn results in smaller droplets would cause greater quantities of dispersion in the next lower stage so that the need for settling time would be increased as the settling is increased. With the process of this invention, however, the increased pressure drop across each tray assembly is distributed so that the great bulk of it is across the first plate in the tray assembly, that is, through the perforations 17 in plate 16. Therefore, the high-kinetic energy, high-velocity and turbulent droplets are discharged into a homogeneous liquid maintained between the plates and the energy is converted to heat or other energy forms which do not form dispersions. The clear liquid discharging from between the plates passes through perforations 19 in plate 18 and experiences substantially less pressure drop and therefore falls as relatively large, low-kinetic energy and non-turbulent droplets which have very little dispersion-forming tendencies.

It may be seen, however, that continually increasing the level to add settling time will eventually result in such high pressure drop through the uppermost plate 16 and such relatively low pressure drop through the lowermost plate 18 that the total throughput of the column will be seriously limited. The tray assembly of this invention overcomes that difficulty as follows. Partition 14 extending upwardly into each contacting stage provides a passageway from a point above the plate experiencing the high pressure drop to below it, however, this passageway is not available for use unless the level reaches a certain predetermined height. Therefore, when sufficient more dense phase is being passed through the column so that the pressure drop across the uppermost plate in each tray severely limits the flow, the level on each tray assembly will rise and ultimately overflow partition 14. The material overflowing partition 14 flows between the plates 16 and 18 and ultimately out through perforations 19 into the next lower stage. In effect, what this does is to distribute the pressure drop between plates 16 and 18 when the throughput is such that the total flow through plate 16 would limit the columns capacity. Since pressure drop increases rapidly with flow rate for a given size orifice, the method of this invention provides a means of moderating the pressure drop effect through the uppermost plate but still maintaining the desirable relatively low pressure drop through the lowermost plate of the tray assembly and thereby obtaining the maximum operability with the minimum of dispersion for any throughput. As hereinbefore discussed, partition 15 which is an optional member of the tray assembly is preferably employed so that the material overflowing baffle 14 contains little if any less dense phase dispersed therein. The shape of this partition as shown herein is conveniently arranged so that no siphoning effect will occur and so that any less dense phase entrained in the more dense phase will tend to separate due to the abrupt change of direction of the flow over partition 14 and pass upwardly into the next higher passageway 11.

Figures 3 and 4, in which the same numbers indicate the same parts, illustrate an embodiment of this invention wherein the less dense phase is dispersed through a continuous more dense phase. In Figures 3 and 4, the less dense phase accumulates as a layer beneath each tray assembly and passes upwardly through perforations 37 in plate 36 accumulating as a layer of clear liquid between the plates and ultimately passing as low-velocity low-kinetic energy droplets through the larger or more numerous perforations 39 in the upper plate 38 and then floating, as droplets, through the dense phase above each tray assembly and reaccumulating in a layer beneath the next higher tray assembly. Partition 32 connecting the upper portion of the tray assembly to an intermediate portion of the next lower stage forms a passageway 31 through which more dense phase passes from above each tray assembly directly into a layer of more dense phase in the next lower contacting stage. Also extending downwardly into each contacting stage is partition 34 which forms passageway 33. When the flow rate of less dense phase is so great that the interface between the less dense and the more dense phase is down to the edge of partition 34, the excess less dense phase passes around the partition through passageway 33 and between the plates 36 and 38. As described in reference to Figures 1 and 2, this flow has the effect of distributing the total pressure drop between the two plates so that the total throughput of the column is not unduly limited by the open area of the plate having less open area, which in this embodiment is the lowermost. In the embodiment of Figures 3 and 4 an ordinary overflow partition 34 is employed, however, if it is desired to have only clear less dense liquid passed through passageway 33, a baffle similar to baffle 15 in Figure 1 may be employed to skim dispersed material and prevent it from passing between the plates of the tray assembly.

Figure 5 illustrates a contacting apparatus consisting of an elongated vertical column broken into contacting stages by a series of the tray assemblies of this invention. Cylindrical shell 40 contains a number of tray assemblies each consisting of perforated horizontal plates 46 and 48. Each tray assembly also contains at least one conduit means formed herein by partition 42 to provide a passageway 41 from beneath each tray assembly to a point intermediate in the next higher contacting stage. Each tray assembly also contains partition 44 which forms a passageway 43 connecting the space between the plates to an intermediate portion of the next higher contacting stage. The column also contains line 50 for introducing more dense phase into the uppermost contacting stage and line 53 for removing more dense phase from the lowermost contacting stage as well as line 52 for introducing less dense phase into the lowermost contacting stage and line 51 for removing less dense phase from the uppermost contacting stage. There may be additional inlet and outlet lines for additional feed streams, reflux streams, side-cuts, etc., when such are desired. In operation of the embodiment of Figure 5, the more dense phase is introduced through line 50, accumulates on the uppermost tray assembly, rains down through the perforations of the tray assembly, passes through the less dense phase as droplets and reaccumulates on the next lower tray assembly. This dispersing and reaccumulating continues throughout the column until eventually the more dense phase collects in the lower portion of the column and is withdrawn through line 53. The less dense phase is introduced into the lower portion of a column through line 52 and passes across each contacting stage and into the next higher one through passageways 41, ultimately being withdrawn from the uppermost portion of the column through line 51.

As hereinbefore stated, the various phases may be two immiscible liquids or a liquid and a gas and a column such as this may find utility in such functions as liquid-liquid extraction, scrubbing, absorption, fractionation, or even transferring energy between phases. In the various uses the perforations may be modified to slots, lined holes, holes having internal fins or other configurations and when employing a liquid-gas contact with the gas phase dispersed the perforations may be modified on the uppermost tray with bubble caps.

From the foregoing description it may be seen that the tray assemblies of this invention provides a means for operating a liquid-fluid contacting column without dispersion problems and furthermore provides a means of distributing the pressure drop across each tray assembly so that high throughputs may be attained.

I claim as my invention:

1. A sieve deck assembly comprising a pair of vertically spaced, horizontal perforated plates, one of said plates having a greater perforated area than the other, first conduit means extending vertically from the plate having the greater perforated area through and beyond the plate having the smaller perforated area, and second conduit means extending vertically from the space between said plates through and beyond the plate having the smaller perforated area, said second conduit means extending a lesser vertical distance from the plate of smaller perforated area than said first conduit means.

2. A sieve deck assembly comprising a pair of vertically spaced, horizontal perforated plates, the lower plate having a greater perforated area than the upper plate, first conduit means extending upwardly from the lower plate through and beyond the upper plate, and second conduit means extending upwardly from the space between said plates through and beyond the upper plate a lesser distance than said first conduit means.

3. A sieve deck assembly comprising a pair of vertically spaced, horizontal perforated plates, the upper plate having a greater perforated area than the lower plate, first conduit means extending downwardly from the upper plate through and beyond the lower plate, and second conduit means extending downwardly from the space between said plates through and beyond the lower plate a lesser distance than said first conduit means.

References Cited in the file of this patent

UNITED STATES PATENTS

| | | |
|---|---|---|
| 2,271,462 | Pfennig | Jan. 27, 1942 |
| 2,528,426 | Davis et al. | Oct. 31, 1950 |
| 2,678,199 | Koch | May 11, 1954 |
| 2,717,854 | Felix | Sept. 13, 1955 |